United States Patent Office 3,615,152
Patented Oct. 26, 1971

3,615,152
CONVEYOR BELTS
Jacques Bouzat, Roland Joug, and Bernard Ragout, Clermont-Ferrand, France, assignors to Pneumatiques Caoutchouc Manufacture et Plastiques Kleber-Colombes, Colombes, France
Filed July 7, 1969, Ser. No. 839,503
Claims priority, application France, July 8, 1968, 158,387
Int. Cl. B65g 15/36, 15/40
U.S. Cl. 198—193
1 Claim

ABSTRACT OF THE DISCLOSURE

This invention relates to reinforced conveyor belts having a longitudinal reinforcing layer and a number of transverse reinforcing layers constituted by parallel elements that are inclined with respect to the median plane of the belt. These transverse layers are arranged symmetrically in relation to the median plane so that their elements cross each other forming, with said plane, angles of equal and opposite direction. The width of the longitudinal reinforcing layer is smaller than the width of any one of the transverse reinforcing layers being between ¼ and ⅔ of such width.

---

Figure 1:
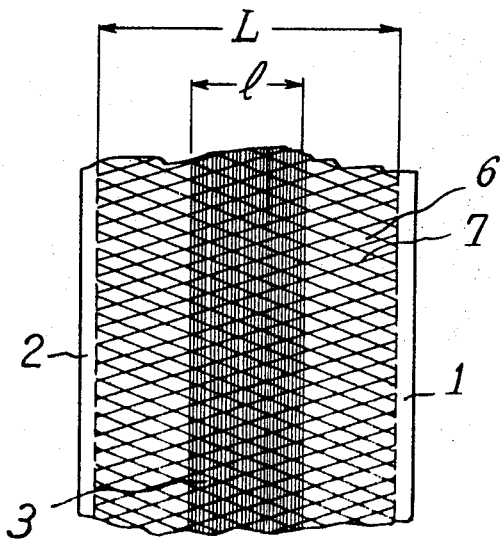

The present invention relates to conveyor belts which are to be formed into a trough or channel shape and are able to withstand very high tensile stresses during service so that they can, without difficulty or damage, travel over a path which involves changes of direction and be returned to the two ends of the conveyor device of which they form part.

An object of the invention therefore is a conveyor belt which has greater possibilities than a conventional belt: a further object is a conveyor belt which is cheaper than present belts of commensurate ability to withstand tensile stresses to which they are subjected during service.

Hitherto conveyor belts which were designed for withstanding high tensile stresses during service have been provided with a longitudinal reinforcement designed to withstand these stresses and distributed over the full width of the belt.

These belts possess the disadvantage of being excessively rigid in a transverse direction, particularly if their resistance to tensile stress is high and their width relatively small. This is true whatever the type of longitudinal reinforcement used, whether it takes the form of a number of superimposed layers of fabrics or of elements such as steel cables arranged in a longitudinal direction and parallel to one another. This excess transverse rigidity means that they cannot easily be shaped into a trough or channel and tend to be rather unstable on the conveyor. If they are made broader, the disadvantage of excessive transverse rigidity is still present and, in addition, the changes in the vertical or horizontal cross-sectional shape of the belt or the path it follows and aso the turning at the two ends of the conveyor set up differences in tension between the various parts of the longitudinal reinforcement due to the fact that the paths followed by each of these parts are different. This leads to the mechanical strength of the reinforcement being increased beyond that strictly necessary to enable it to withstand the maximum tensile stress to which it is subjected in service and this increase in the mechanical strength in turn leads to an increase in the transverse rigidity of the belts and to the disadvantage mentioned above.

On the other hand, some conveyor belts have been constructed which are able to travel over paths involving considerable changes in cross-sectional shape and in which the reinforcement is concentrated into the axial zone. However, these belts do not withstand high tensile stresses in service and, in addition, their transverse rigidity is such that, although they are able to turn round curves of a relatively small radius, both horizontaly and vertically, they cannot be loaded with heavy materials without the materials spilling off the belt.

Conveyor belts according to the invention may be narrow and able to withstand high tensile stresses in service without thereby becoming unstable and difficult to form into a trough or channel. They must also be wide and designed to withstand high tensile stresses without the variations in cross-sectional shape or the curves between the various parts of the longitudinal reinforcement setting up harmful differences in tension.

Moreover, when the belts of the invention are formed into a trough or channel, the material does not overflow of whatever kind it may be and whatever the changes in direction of movement of the belts.

Belts according to the invention are provided with a reinforcement which comprises:

(a) a centre layer restricted to an axial zone which groups together the longitudinal reinforcement and which is of a width less than that of the belt. This layer which is hereinafter referred to as the "longitudinal layer," has a width of between on-quarater and two-thirds of the transverse reinforcement.

(b) two layers or more which are superimposed and are composed of identical elements parallel to one another and inclined relatively to the median plane of the belt. These layers are arranged so that the elements of either layer are inclined relatively to the median plane of the belt by equal but opposite angles and extend over the full or almost full width of the belt. These layers in their entirety will hereinafter be referred to as the "transverse reinforcement."

The longitudinal layer which may be split in the direction of the width into a number of separate longitudinal layers is symmetrical relatively to the median plane of the conveyor belt. Its width is between one-quarter and two-thirds of the width of the transverse reinforcement.

The longitudinal layer may be composed of cables or strands of a material which, like metal, has a high mechanical strength. As will be seen below, it may be advisable in certain cases to locate the longitudinal layer in a longitudinal projection located on the reverse side of the belt.

The elements of the layers forming the transverse reinforcement are monofilaments, wires, strands or cables of any suitable material such as a metal, glass, or natural or a synthetic fabric.

The elements of a layer in the transverse reinforcement and those of the adjacent layer form rhombi which are embedded in an elastic material and are deformable.

The angle formed by the elements of the layer constituting the transverse reinforcement is generally between 30° and 60°, and preferably between 40° and 50°, and is chosen so as to give to the conveyor belt the desired transverse rigidity. To this end, account is taken also of the characteristics of the elastic material in which these elements are embedded, of the thickness of the elastic material separating the two materials and of their spacing, i.e. the size of the rhombi formed by the elements of adjacent layers.

The longitudinal layer may, depending upon the degree of transverse rigidity which is required, be located below or above the transverse reinforcement, or again between the layers which constitute the reinforcement.

Figure 2:
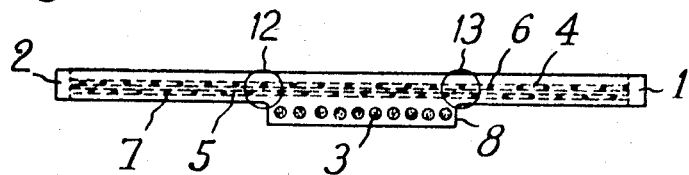
Figure 3:
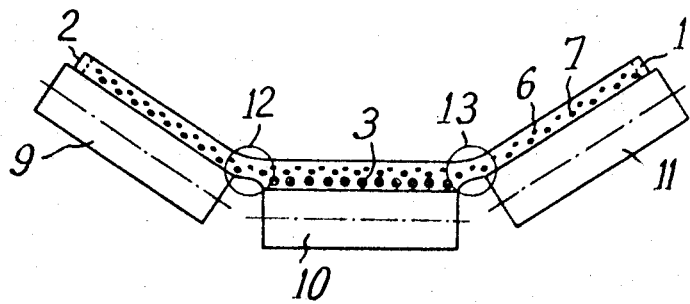

The invention will now be described in more detail by means of the following description of one embodiment given by way of non-limiting example which, at the same time, will show other advantages of the invention. This embodiment is shown diagrammatically in the accompanying drawings, which are not to scale, so as to make certain aspects clearer, and in which:

FIG. 1 shows a plan view of a conveyor belt according to the invention, which is assumed to be transparent, FIG. 2 shows a view in cross-section of the belt shown in FIG. 1, FIG. 3 shows a cross-sectional view of the belt shown in FIG. 1 when formed into a trough or channel shape and mounted on the conveyor rollers.

Referring now to the drawings, as is normally the case, the conveyor belt is provided with edgings 1 and 2, i.e. longitudinal and lateral zones of elastic material without reinforcement.

The longitudinal layer, which is designed to withstand longitudinal tensile stresses, is composed of metal cables 3 embedded in an elastic material parallel to the median plane of the belt and arranged in one plane. This layer, which is symmetrical to the median plane of the belt has a width $l$ smaller than the width $L$ of any one of the transverse reinforcement layers. Generally speaking, the ratio $l:L$ is between 1:4 and 2:3 and is preferably of the order of 1:3.

The longitudinal layer is located in a portion 8 which forms a longitudinal projection on the reverse side of the belt. This arrangement has the effect of giving the belt, over its full width, a thickness which would be useless and which would, moreover, increase the transverse rigidity of the belt to a degree which would deleteriously affect its shaping into a trough or channel.

The layers 4 and 5 which form the transverse reinforcement are composed of elements 6 and 7 which are parallel to one another and inclined at the same angle to the median plane of the belt. The layers 4 and 5 are arranged symmetrically relatively to this median plane so that the angle formed by the element 6 is equal but oppositely directed to the angle formed by the elements 7 with the said median plane. Thus the elements 6 and elements 7 form deformable rhombi.

The provision of skewed layers such as 4 and 5 is well known in the art. It is conventional, for example, to prepare a layer of corded fabric in which the elements 6, which are positioned longitudinally and parallel to one another are embedded in an elastic material and to cut this layer into oblique strips at an angle equal to that by which the elements 6 are inclined relatively to the median plane of the conveyor belt and then to juxtapose these strips.

In the embodiment, the elements 6 and 7 are steel cables which are much finer than the cables 3 which constitute the longitudinal layer.

As is seen in FIG. 3, when a conveyor belt according to the invention is channelled or formed into a trough shape and arranged on a conveyor drive means formed by assemblies of three rollers 9, 10 and 11, the portion comprising the longitudinal layer rests on central horizontal rollers 10 while the lateral portions, which only comprise the transverse reinforcement, rest on the inclined rollers 9 and 11. Thus, the flexure corresponding to the channelling of the belt is effected in parts 12 and 13 which are not provided with a transverse reinforcement and which therefore have a transverse rigidity which is less than that of the centre portion. To this end, the width of the longitudinal layer is never greater than that of the horizontal portion of the belt but may be less.

The transverse reinforcement, which is constituted of elements which cross to form rhombi is stressed and flexes under conditions very different from those of the transverse reinforcement constituted by elements arranged in a transverse direction, when these elements are the threads of a biassed fabric or parallel elements independent of one another and perpendicular to the median axis of the belt.

When belts according to the invention change direction vertically, the centre layer remains flat and only the different portions of the walls of the trough or channel travel along paths of different lengths, the said paths being, in the direction of slope, shorter or longer than the path travelled by the longitudinal layer. These differences in the length of the path are, in the case of the transverse reinforcement in belts of the invention, compensated by the elastic deformation of the rhombi formed by the superimposed elements of the various layers without the walls of the trough or channel being subjected to deformations which would cause the material on the belt to be split off or would give rise to undesirable differences in tension.

When belts according to the invention change direction or shape in a horizontal direction, the portions of the belt which are only provided with a transverse reinforcement act as described above, the elastic deformations of the rhombi compensating the differences in the path travelled by the different portions of the walls of the channel. The longitudinal layer is narrow as compared with the total width of the belt so that the differences in tension between the different portions of the belt are relatively small and this is a great advantage.

Hence, assuming a uniform change of profile and uniform turning distances, the differences in tension are much smaller than in the case of belts having longitudinal reinforcements distributed over the full width of the belt. This means that the reinforcement need be given only the strength necessary to withstand tensile stresses.

If it be remembered that in the longitudinal layer of belts according to the invention it is possible to allow for the same differences in tension as in belts having a reinforcement distributed over the full width, the changes in profile may be much greater than the turning distances much smaller.

Thus conveyor belts which, according to the invention, combine a longitudinal layer and a transverse reinforcement as described above may simultaneously withstand high tensile stresses in service, possess a transverse rigidity which is accurately adjusted to the value desired to enable their shaping into a channel to be effected without difficulty and so as to avoid any spillage of materials, may follow paths involving considerable changes in cross-section and may be easily turned. Moreover, when in service, their operating conditions are improved and their life is therefore longer.

We claim:

1. A reinforced endless conveyor belt having a reinforcement that comprises a first layer of reinforcing members extending longitudinally throughout the length of the belt and positioned symmetrically about the longitudinal axis of the belt, and second and third layers of reinforcing members positioned symmetrically about the said longitudinal axis and extending throughout the length of the belt, the members of each respective second and third layer extending parallel to one another and across substantially the whole width of the belt, the members of the second layer being angled with respect to the members of the third layer and being at an equal angle to the said axis as the angle made thereto by the members of the third layer and the first layer having a width which is between one quarter and two thirds of the width of either the second or the third layer, said conveyor belt having a central portion of greater thickness than the side portions, the central portion projecting on the reverse side of the belt and the first layer of reinforcing members being located in the projecting portion.

References Cited

UNITED STATES PATENTS

| | | | |
|---|---|---|---|
| 1,612,024 | 12/1926 | Jacobs | 198—193 X |
| 2,141,796 | 12/1938 | Loges | 198—193 |
| 3,047,446 | 7/1962 | Henson | 198—193 X |
| 3,212,627 | 10/1965 | Beebee | 198—193 |
| 3,181,690 | 5/1965 | Jenkins | 198—193 |
| 3,310,161 | 3/1967 | Kraft | 198—193 |
| 3,464,538 | 9/1969 | Hartmann | 198—201 |
| 2,818,962 | 1/1958 | Horth | 198—201 X |

FOREIGN PATENTS

| | | | |
|---|---|---|---|
| 209,824 | 8/1957 | Australia | 198—193 |
| 239,252 | 6/1962 | Australia | 198—193 |
| 834,366 | 2/1952 | Germany | 198—201 |
| 912,985 | 12/1962 | Great Britain | 198—201 |
| 1,028,859 | 5/1966 | Great Britain | 198—193 |
| 337,449 | 5/1959 | Switzerland | 198—193 |

EVAN C. BLUNK, Primary Examiner

W. S. CARSON, Assistant Examiner